Oct. 20, 1936.  D. R. ISLES  2,058,316
WATER SAVER DEVICE FOR STEAM LINES AND AIR CONDITIONING
Filed Sept. 19, 1935
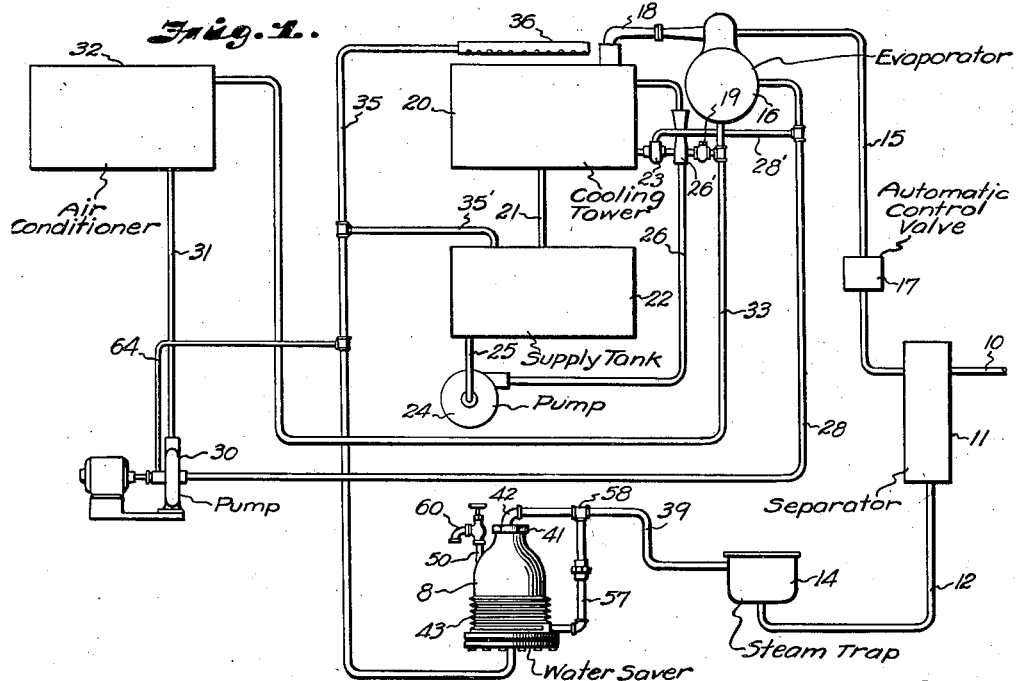
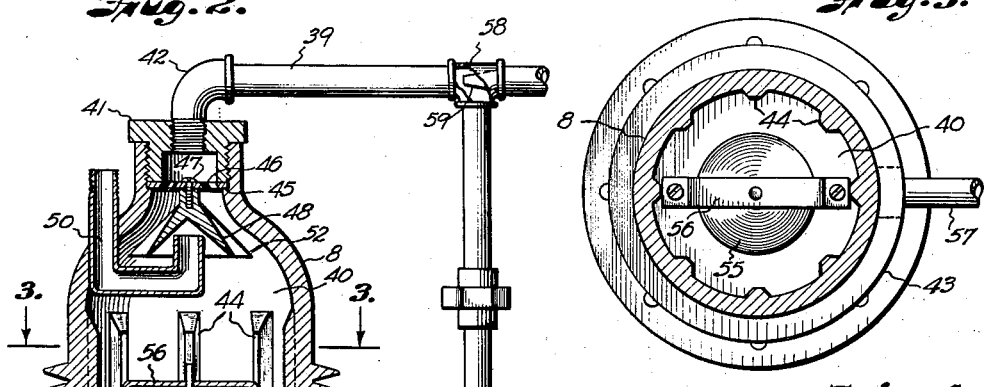
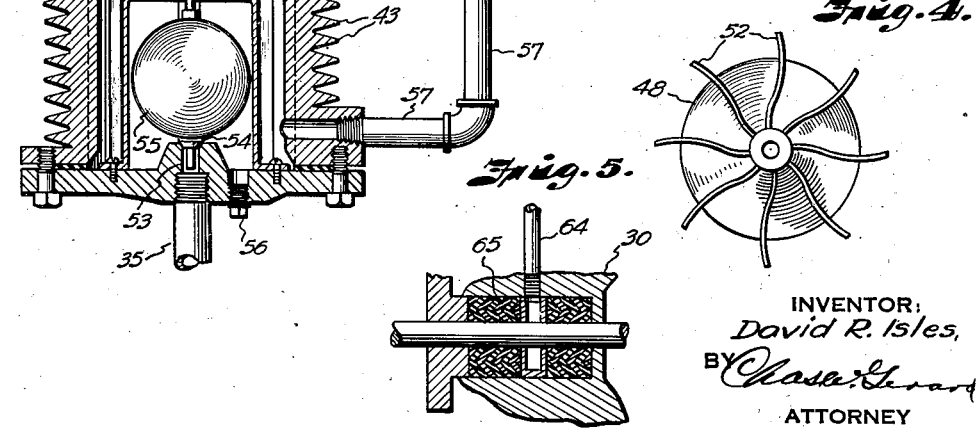
INVENTOR:
David R. Isles,
BY Chas. A. Gerard
ATTORNEY Patented Oct. 20, 1936

2,058,316

UNITED STATES PATENT OFFICE 2,058,316

WATER SAVER DEVICE FOR STEAM LINES AND AIR CONDITIONING

David R. Isles, Topeka, Kans.

Application September 19, 1935, Serial No. 41,333

5 Claims. (Cl. 261—36)

The present invention relates to appliances designed for operation in connection with steam lines for the purpose of effecting certain economies in the operation of steam equipment, such as the prevention of waste of steam and water, which is accomplished by means enabling the device to function not only as a condenser, trap and separator device but also as a medium for controlling or regulating the pressure at which the water is allowed to be discharged therefrom.

The improved appliance is of special value in relation to the steam and water connections of air conditioning equipment, although its usefulness is such as to adapt it to still wider application; and one of the primary objects of the invention is to provide an appliance of this character in which the several functions, as a condenser, separator and trap, as well as pressure controlling or regulation function if desired, may be carried out by means of a construction comprised within a single operating device or structural unit.

It is also an object of the invention to improve generally the operation of steam trap constructions, and particularly with reference to the water-saving function; and in this connection it is incidentally an object to make provision for enabling pure water of superior quality to be supplied to bearing structures in installations wherein the improved appliance is being operated.

With the foregoing general objects in view, the invention will now be described by reference to the accompanying drawing illustrating the improved appliance, in operative relation to a common form of air-conditioning equipment, after which the outstanding advantages of the improvement will be outlined in proper detail, and the several features and combinations deemed to be novel and patentable duly set forth and claimed.

In the drawing—

Figure 1 is a diagrammatic view showing the improved appliance in elevation, together with the various steam and water pipe connections with which the appliance is designed to operate in relation to an air-conditioning equipment;

Figure 2 is a central vertical sectional view of the improved device, on a larger scale;

Figure 3 is a horizontal section, representing a section taken on the line 3—3 of Figure 2;

Figure 4 is an enlarged detailed plan of the cone and baffle construction comprising a part of the separator feature of the construction; and Figure 5 is an enlarged detailed sectional view of a part of one of the pump bearings in relation to a water sealing pipe supplied by water derived from my improved device.

In the drawing the improved trap and water-saving device, indicated generally by the numeral 8, is illustrated in Figure 1 in operative relation to an air-conditioning system, of a type now being quite generally installed in railway passenger cars, using steam from the steam line of the train, with water as the refrigerant. Such a system comprises a steam line 10 leading into a separator unit 11 connected by a pipe 12 with a trap 14 and also by a pipe 15 with an evaporator unit 16,—said pipe 15 being also provided with an automatic control valve 17 of common design. The evaporator unit 16 communicates through a nozzle device 18 with a cooling tower unit 20 connected by a pipe 21 with a water supply tank 22, the necessary circulation of water being maintained by a suitable pump 24 having pipe connections 25 and 26 to said tank 22 and the unit 20 respectively. A pipe 28 connects the evaporator tank 16 with a pump 30 whereby cold water from said tank 16 is pumped through a pipe 31 to an air-conditioning unit 32, after which said water is re-circulated from said unit 32 by a pipe 33 back to the evaporator unit 16.

The pipe line 26 is provided with a nozzle element 26' communicating with the pipe 33 by way of a check valve 19, and also communicating with the tank 20 by way of a strainer element 23 which is connected by a pipe 28' with the pipe 28—see Figure 1.

In systems of this character as now generally installed, the pipe 35 leading to the header 36 at the air intake of the cooling tower 20 is connected directly with the steam trap 14; but such an arrangement is impractical and unsatisfactory for various reasons, for the output from the trap 14 is very hot, and hence heats the condenser coils as well as the water used to cool them; moreover, there is back pressure developed tending to stem the flow of water from the trap, which causes wet steaming in the separator, and irregular action in the trap sometimes allows steam to work on through into the cooling tower, which also results in a spurting of steam and water at the header 36, with a loss of water and frequent spraying of it over the outside of the unit 20 into the cars.

In my improved arrangement, I provide the unit 8 which is installed between the cooling tower 20 and the trap 14, and connected by a pipe 39 with the exhaust from said trap 14. This unit is of approximately jug-shaped construction as illustrated in Figures 1 and 2, providing a combined trap and separating chamber 40 having a top closure member 41 which is fitted with an L 42 connected with said pipe 39. The exterior of the unit 8 is formed with a plurality of cooling fins 43, while its interior is formed with spaced vertical ribs 44, as shown in Figures 2 and 3. The closure member 41 clamps against a skeleton disk 45 having openings 46 for the passage of steam or condensation from the pipe 39, and to the center of said disk is attached, as by a screw 47, a cone-shaped deflector element 48 in overhanging relation to one leg of an approximately U-shaped vent pipe 50, the other leg of which pipe 50 is projected through to the exterior of the jug 8, as shown in Figure 2. The outer side of the cone element 48 is provided with a plurality of curved baffle or deflecting ribs 52, as more clearly represented in Figure 4.

The bottom of the jug unit 8 is provided with an outlet port 53 communicating with the intake end of the pipe 35, which port is controlled by a valve 54 associated with a float 55 retained for limited vertical movement within a suitable cage 56. A branch pipe 57 is also provided for connecting the pipe 39 with the bottom of the unit 8, into communicating relation with the chamber 40 therein. The connection between the pipes 39 and 57 is by means of a T 58 within which a nozzle 59 is located in position for exerting an injector action at the top of the pipe 57 in the direction of the L 42, as illustrated in Figure 2.

Since the pipe 50 functions as a vent outlet, any suitable means, such as a valve fitting 60, may be provided to regulate the discharge therethrough, as indicated in Figure 1, thereby correspondingly regulating the degree of pressure which is developed within the chamber 40 for discharging the water into the feed line 35.

In the operation of the apparatus as above described, the steam or condensate discharged from the trap 14 (or any other source of steam supply with which the appliance may be used) passes through the nozzle 59 into the top of the jug unit 8, creating a partial vacuum within the pipe 57, the influence of which is of course transmitted to the bottom portion of the chamber 40, thereby drawing water through the pipe 57 to mix with the steam, for promoting condensation. As this jet, comprising a mixture of water and steam, is discharged into the top of the chamber 40, under conditions involving a reduction in velocity, as well as in temperature and pressure, there results a trapping out of masses of water which encounters the cone deflector element 48 which element, in addition to imparting a whirling motion to the flow of steam and condensation (by means of the spiral formation 52) directs the flow toward the outer walls of the chamber 40 where it is further guided by the ribs 44 to the bottom or water-collecting portion of the chamber. What steam remains in the combined flow of steam and water is directed by the interior of the cone baffle member into the inner end of the vent pipe 50, and the discharge of such vent flow is regulated by the setting of the valve 60.

When the chamber 40 is empty or the water therein is below a given level, the float 55 maintains the valve 54 closed; but as the water rises above that level the float rises to open the valve to allow some water to escape by way of the pipe 35, said valve being automatically closed by the action of the float when said given water level is restored. Since a certain amount of pressure will always be produced within the chamber 40 so long as the flow of steam and condensate is supplied from the trap 14, this pressure serves to drive the water escaping past the valve 54, during the opening movements thereof, on through the pipe 35 to the header 36 at the top of the cooling tower, which pressure may be set or regulated as already indicated by means of any suitable valve, such as indicated at 60, for maintaining an even pressure delivery of the water during the operation of the system.

In some installations it may be desirable to make a connection with the tank 22 from the unit 8, as indicated at 35', in such a way that the flow to the tank 22 may take place by gravity.

The bottom of the jug unit 8 may also be provided with a suitable drain plug 56 as a means for appropriately draining the chamber 40, as illustrated in Figure 2.

It will be apparent therefore that the improved device performs, by means of a single unit or operative structure, the several different functions of a steam trap, a condenser for the steam so trapped, a separator for retrieving the water, and a pressure tank for maintaining the water under suitable pressure and delivering it under an even discharge pressure into the service pipe for use in the cooling tower. It will also be apparent that the operation of the improved device is such as to overcome the objections and disadvantages attending the operation of a system in which the water line to the cooling tower is connected directly with the steam trap 14. This is obviously due to the fact that, besides operating continuously and automatically, there is removal and separation of the condensation as fast as it accumulates from the combined flow of steam and condensate, and no opportunity is afforded for the escape of live steam from the chamber 40 past the discharge valve 54. Thus such steam, which is actually wasted in the usual operation, is for the most part saved by the improved appliance, and furthermore is prevented from reaching the cooling tower, with the undesirable heating effects and consequent loss in efficiency, etc. already referred to above. Wet steam in the separator, back pressure in the water feed line, and spurting of steam or water sprays from the header, are likewise eliminated, with the result that not only is more water saved but the water reaches the cooling tower in a much cooler state, and in a more constant and even flow, due to the regular and uniform operation of the unit 8.

In Figure 1, I have also illustrated an advantageous feature which may be employed in connection with the water-feed line 35, by using the same to supply water of proper quality for the pump seal line 64, which conducts such water to the bearing structure 65 of the pump 30, as illustrated in Figure 5. The water retrieved by the operation of the unit 8 is of course in a substantially pure state, and therefore superior for such use, as a seal, in prolonging the life of the pump bearing.

While I have illustrated and described the improved appliance as operating as a single unit for the performance of multiple functions, it is of course apparent that one or more of such functions may be dispensed with according to the demands of the installation with which it is used; and while I have illustrated its use in a special installation for air-conditioning operation, it is also obvious that its application is not confined to such use, as the same will function successfully in other relations, where any of the described functions are to be fulfilled by its operation.

It is my desire therefore not to be limited with respect to the scope of my invention, otherwise than as defined by the appended claims.

Having described my invention, what I claim and desire to secure by Letters Patent is:

1. A trap construction comprising a receptacle providing a collecting chamber, an exhaust steam conduit leading into said chamber, a return pipe connecting the bottom of said chamber with said conduit and having means for producing an injector action at its junction with said conduit in the direction of the intake to said chamber, means providing a steam vent from the chamber, and an outlet provided with a float control for regulating the liquid discharge from said chamber.

2. A trap construction comprising a receptacle providing a liquid collecting chamber, an exhaust steam conduit leading into said chamber, a return pipe connecting the bottom of said chamber with said conduit, a jet nozzle at the junction between said pipe and conduit for producing an injector action in the direction of the intake to said chamber, and a float-controlled outlet from the bottom of said chamber.

3. A trap construction comprising a receptacle providing a liquid collecting chamber, an exhaust steam conduit leading into said chamber, a skeleton disk element intercepting the flow into said chamber, a cone deflector member suspended from said disk in position for directing the steam toward the outer walls of the chamber for promoting the separation of condensate, means providing a steam vent passage from the chamber, and means for automatically controlling the outlet from the bottom of said chamber.

4. A trap construction comprising a receptacle providing a liquid collecting chamber, an exhaust steam conduit leading into said chamber, a cone deflector element intercepting the flow into the chamber and provided with curved baffles for imparting a spiral outward movement to the flow toward the outer walls of the chamber for promoting the separation of condensate, the interior face of said chamber walls having a plurality of spaced vertical ribs extending from the upper portion of the chamber to the bottom thereof, and a liquid outlet provided with means for automatically controlling the discharge from the bottom of said chamber.

5. A trap construction comprising a receptacle providing a liquid collecting chamber, an exhaust steam conduit leading into said chamber, a cone deflector element intercepting the flow into said chamber and directing the same toward the outer walls thereof for promoting the separation of condensate, a U-shaped steam vent pipe having its intake end positioned within the central portion of said deflector element and its outlet end projecting upwardly out through the upper portion of said chamber, means for regulating the vent discharge from the outlet end of said vent pipe, and an automatically controlled outlet from the bottom of said chamber.

DAVID R. ISLES.